US010270879B1

(12) United States Patent
Wallner et al.

(10) Patent No.: US 10,270,879 B1
(45) Date of Patent: Apr. 23, 2019

(54) MULTI-TENANT CACHING STORAGE INTELLIGENCE (71) Applicant: EMC Corporation, Hopkinton, MA (US)

(72) Inventors: Ryan J. Wallner, South Grafton, MA (US); Kenneth Durazzo, San Ramon, CA (US); Patrick J. Mullaney, Derry, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/585,820

(22) Filed: Dec. 30, 2014

(51) Int. Cl.
H04L 12/26 (2006.01)
H04L 29/08 (2006.01)

(52) U.S. Cl.
CPC .......... *H04L 67/2852* (2013.01); *H04L 43/08* (2013.01)

(58) Field of Classification Search
CPC ................ G06F 3/067; G06F 9/45558; G06F 2009/45579; G06F 9/5077; G06F 3/0604; H04L 67/1097; H04L 67/10; H04L 67/2842; H04L 67/1095; H04L 12/4633; H04L 49/70; H04L 12/4641; H04L 63/20; H04L 29/06; H04L 45/64; H04L 41/0806; H04L 12/28; H04L 47/783; H04L 47/825; H04L 49/354; H04L 61/6004; H04L 63/0428; H04L 67/2804; H04L 67/2852; H04L 67/42; H04L 69/03; H04L 69/22; H04L 2209/125; H04L 2209/24; H04L 41/08; H04L 41/0803
See application file for complete search history.

(56) References Cited

U.S. PATENT DOCUMENTS

| 2014/0052864 A1* | 2/2014 | Van Der Linden ... G06F 9/5077 709/226 |
| 2014/0052945 A1* | 2/2014 | Ashok .................. G06F 3/0608 711/159 |
| 2015/0135003 A1* | 5/2015 | Cota-Robles ....... G06F 11/1666 714/6.3 |
| 2016/0132806 A1* | 5/2016 | To .................... G06Q 10/06313 705/7.23 |
| 2016/0205187 A1* | 7/2016 | Sorenson, III ...... H04L 67/1095 709/219 |

* cited by examiner

Primary Examiner — Djenane M Bayard
(74) Attorney, Agent, or Firm — Krishnendu Gupta; Jason Reyes; Anne-Marie Dinius (57) ABSTRACT A system, computer program product, and computer-executable method for managing data I/Os from an application in communication with a cache appliance, wherein the cache appliance is in communication with a cloud storage provider having a first portion of data, the system, computer program product, and computer-executable comprising receiving a data I/O from the application, wherein the data I/O relates to the first portion of data on the cloud storage provider, analyzing the data I/O, creating a caching policy based on the analysis of the data I/O, creating a tenant cache resource vessel based on the caching policy, and managing the data I/O using the tenant cache resource vessel based on the caching policy.

18 Claims, 9 Drawing Sheets

MULTI-TENANT CACHING STORAGE INTELLIGENCE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method for managing data I/Os from an application in communication with a cache appliance, wherein the cache appliance is in communication with a cloud storage provider having a first portion of data, the system, computer program product, and computer-executable comprising receiving a data I/O from the application, wherein the data I/O relates to the first portion of data on the cloud storage provider, analyzing the data I/O, creating a caching policy based on the analysis of the data I/O, creating a tenant cache resource vessel based on the caching policy, and managing the data I/O using the tenant cache resource vessel based on the caching policy.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Typically, consumers of data storage are using public cloud data storage to fulfill data storage needs. Traditionally, consumers of public cloud storage use interfaces to access their public cloud data storage that are inherently lethargic and costly in relation to both bandwidth and latency performance. Generally, the data storage industry would benefit from being able to bridge the performance latency and bandwidth of local data storage with the availability and mobility of public cloud resources.

In many embodiments, the current disclosure may enable creation of a caching appliance which may include multi-tenant caching intelligence. In various embodiments, the current disclosure may enable combining the cost and/or performance of a local data storage system with the availability and/or mobility of public cloud storage. In certain embodiments, the current disclosure may enable creation of a hybrid-cloud data storage solution which may utilize on premise and/or off premise data storage systems. In some embodiments, on premise data storage systems may include data storage arrays, fast storage appliances, and/or caching appliances.

In most embodiments, a caching appliance may include internal hardware resources such as, but not limited to, data storage, fast storage devices, cache, CPUs, DRAM, and/or other hardware resources. In some embodiments, a caching appliance may be enabled to provide virtual cache for one or more tenant applications to facilitate improved performance access to one or more secondary data storage systems. In other embodiments, a secondary data storage system may include a data storage array, data storage system, NVM appliance, flash appliance, a public cloud storage provider and/or a private cloud storage provider. In various embodiments, a caching appliance may be enabled to provide virtual cache for one or more tenant applications to facilitate high performance access to public cloud data storage. In certain embodiments, a caching appliance may be enabled to provide virtual cache for a multi-tenant environment, where each tenant application may be isolated from other tenant applications using the cache appliance and/or public cloud data storage.

In some embodiments, a caching appliance may be enabled to provide one or more shared virtual caches where two or more tenant applications may be able to access and/or utilize the shared virtual cache. In certain embodiments, a caching appliance may be enabled to manage one or more virtual caches using one or more cache policies. In some embodiments, a cache policy may include one or more rules governing management of data using one or more virtual caches. In most embodiments, a data consumer's data storage environment may include a controller module to direct usage of a caching appliance. In various embodiments, a caching appliance may include a controller module to direct usage of the caching appliance. In most embodiments, rules included in a policy may include declarations about, or, or including the data. For example, in one embodiment, a rule may be that only objects of less than five (5) GB may be placed in storage Cache A. In another embodiment, a rule may be that designated data and/or blocks of data may only exist in Cache A for a specified amount of time before stale, then the designated data and/or blocks of data may be moved to Cache B, where cache B may be slower than Cache A. In yet another embodiment, a rule may be that data from location A may not be cached.

In many embodiments, a caching appliance may be enabled to communicate with one or more cloud storage providers simultaneously. In various embodiments, a caching appliance may be enabled to communicate with a cloud storage provider utilizing block level storage, object level storage, file level storage, and/or comparable storage systems. In certain embodiments, a caching appliance may be enabled to convert incoming data from an external data storage source, such as a cloud storage provider, from a first type of storage to a second type of storage. For example, in some embodiments, a caching appliance may be enabled to convert data received as block storage into data in object store format.

In various embodiments, a caching appliance may include internal hardware resources, a virtualization module, data management module, controller module, policy management module, hardware interface module, and/or an Advanced Programming Interface (API). In some embodiments, internal hardware resources may include RAM, fast storage, data storage, network bandwidth, virtual network infrastructure and/or CPUs. In most embodiments, a virtualization module may be enabled to create a combination of one or more of virtualized cache and/or virtualized hardware to process data I/Os for one or more tenant applications. In various embodiments, virtualized cache may include one or more tiers of data storage which may be enabled to be used by a tenant application to facilitate access to data stored within a cloud storage provider. In certain embodiments, one or more tiers of data storage may include rotational discs, fast data storage, and/or cache located within a caching appliance. In other embodiments, one or more tiers of data storage may include data storage systems, data storage appliances (i.e., flash appliances and/or Non-volatile Memory appliances), and/or data storage arrays in communication with the caching appliances. In some embodiments, one or more tiers of data storage may include a combination of data storage internal to the caching appliance and external to the caching appliance (i.e., in communication with the caching appliance).

In many embodiments, a data management module may be enabled to move data to and from a caching appliance. In various embodiments, a data management module may be enabled to cache data within a virtual cache of the caching appliance from a cloud storage provider. In certain embodiments, a data management module may be enabled to update a cloud storage provider with updates from a virtual cache of the caching appliance. In other embodiments, a data management module may be enabled to load hot data from a cloud storage provider to a virtual cache of a caching appliance. In some embodiments, a data management module may be enabled to move cold data from a virtual cache of a caching appliance to a cloud storage provider. In other embodiments, a data management module may move data between a virtual cache and one or more cloud storage providers based on one or more caching policies.

In most embodiments, a controller module may be enabled to direct a caching appliance to allocate and/or unallocated a virtual cache for one or more tenant applications. In various embodiments, a controller module may be enabled analyze data I/Os to determine resource needs of one or more tenant applications utilizing a caching appliance. In certain embodiments, a controller module may be enabled to direct a policy management module to create one or more caching policies which may be enabled to manage one or more virtual caches of a caching appliance. In many embodiments, a controller module may be enabled to determine what tiers of data storage may be used for one or more tenant applications utilizing a caching appliance.

In various embodiments, a policy management module may be enabled to create one or more caching policies which may be used for managing one or more virtual caches on a caching appliance. In some embodiments, a caching policy may include attributes about a specific storage type and how the storage type may interact with the cache. For example, in an embodiment, block access may be used and the cache may be designated to only some of the data, while the rest of the data may be synced to a cloud provider. In this embodiment, a policy may signal to the data storage system how and what data should exist in the cache.

For example, in an embodiment, a caching policy can include the following information.
Policy name=cachePolicy1
Access Type=object:REST
Backing store type=object
Cache=<Cache UUID>
Endpoint Type=Object
Endpoint Access URL=<Specified URL>
Cache Attributes:
Max Size=4000 KB (single objects)
Expire=30 s
Hash=<Hash ID>
Control String="private"

In this embodiment, the caching policy is an example of a caching policy implemented on object storage. The caching policy designates the maximum size for each object stored in cache as well as how long each object may reside within cache. Additionally, the caching policy designates the interface type, underlying data storage type, as well as other information relating to usage of the cache.

In many embodiments, a caching policy may designate a policy name, access type, backing store type, cache, endpoint type, endpoint access URL, cache attributes, and/or control strings. In various embodiments, a caching policy may include what type of cloud storage providers may be used with the cache, such as file, block, object, and/or other types of data storage file systems. In certain embodiments, a caching policy may include what type of file system may be used to store data within the virtual cache itself. In some embodiments, a caching policy may indicate that one or more users of a virtual cache may desire data translated into one or more file systems, such as, but not limited to, file, block, and/or object. In certain embodiments, a caching policy may indicate which users and/or applications may use a virtual cache. In various embodiments, a caching policy may specify that one or more portions of hardware resources may be used with the virtual cache. In other embodiments, a caching policy may specify how much and/or whether data storage external to a cache appliance may be used to create the virtual cache.

In certain embodiments, a caching appliance may include an Advanced Programming Interface (API) which may be enabled to expose virtual caches on the caching appliance to one or more tenant applications. In some embodiments, an external controller module may be enabled to use an API to direct a Caching Appliance. In most embodiments, a Hardware Interface may be utilized to communicate with internal data storage systems and/or public cloud storage providers.

In many embodiments, a user and/or administrator may be enabled to use a cache appliance as an acceleration layer in a data storage system. In various embodiments, a cache appliance may be enabled to accelerate data I/Os between each source of data storage within a data storage environment. For example, in many embodiments, a cache appliance may be enabled to accelerate data I/Os between a tenant application and a cloud storage provider. In other embodiments, a cache appliance may be enabled to accelerate data I/Os between a tenant application and a data storage array within the same data storage environment. In various embodiments, a cache appliance may be utilized to place one or more portions of data close to users and/or tenant applications. In certain embodiments, a cache appliance may be enabled to be managed and/or deployed as a tier of data storage.

In most embodiments, a cache appliance may be utilized to abstract data storage interfaces. In various embodiments, a cache appliance may be enabled to simplify interfaces of data storage systems connected to the cache appliance. In certain embodiments, a cache appliance may be enabled to perform conversion services for users of the cache appliance. In many embodiments, conversion services may include, for example, exposing data using a NFS mount when the backend data storage system may use a block interface.

In many embodiments, a caching appliance may be enabled to dynamically partition virtual caches. In various embodiments, a caching appliance may be enabled to support separate tenants in a multitenant computing environment with one or more tenant cache resource vessels which may contain a virtual cache. In certain embodiments, a cache appliance may include a controller module which may be able to direct the cache appliance to create a virtual cache with a requested amount of hardware resources. In other embodiments, a cache appliance may be in communication with an external controller module in an external data storage system. In most embodiments, once a tenant cache resource vessel has been created, a cache appliance may be enabled to attach the tenant cache resource vessel to a storage system and/or a tenant aware network. In various embodiments, a tenant cache resource vessel may contain a virtual cache, internal hardware resources, and/or one or more cache policies.

In many embodiments, a cache policy may include rules which may be applied to each individual tenant's cache. In various embodiments, a cache policy's rules may determine the tier of storage to be used based on access frequency, object type, caching semantics, and/or other access metrics. In certain embodiments, cache policy rules may also extend to the cloud storage provider. In some embodiments, cache policy rules may be applied such that access frequency at the cache appliance may affect the cloud tier of which the data is permanently stored in.

In various embodiments, shared virtual caches may be created such that they may be attached to multiple tenant specific networks. In certain embodiments, shared caches may allow for efficient use of the hardware resources of a caching appliance. In some embodiments, certain types of data may lend themselves to being shared (i.e., operating system images, applications, public information/databases). In most embodiments, the benefit of shared virtual caches may be the ability to isolate and maintain security of data amongst tenants, including exercising different policies amongst the tenants. For example, in some embodiments, a cryptographic policy may be applied to a first tenant while not applying any cryptography for a second tenant, while the same shared storage pool may be leveraged. In most embodiments, shared virtual caches may be leverage mechanisms such as virtual tenant identifiers as a mechanism for policy enforcement, application and for isolation of the tenant's data. In various embodiments, virtual identifiers may be leveraged to provide persistency hints which may ensure the proper storage hierarchy binding to adhere to the different Storage Level Agreement (SLA) per tenant.

In most embodiments, a caching policy may implicitly extend to multitenant Quality of Service (QoS) requirements. In various embodiments, during the virtual cache-provisioning step, resources may be dedicated to a particular tenant's cache. In certain embodiments, dedicated resources may determine the QoS profile and cache behavior for a tenant. For example, in some embodiments, a tenant's cache with a restricted percentage of the overall cpu and network bandwidth may be constrained to those limits and may not affect other tenant cache limits.

Figure 1:
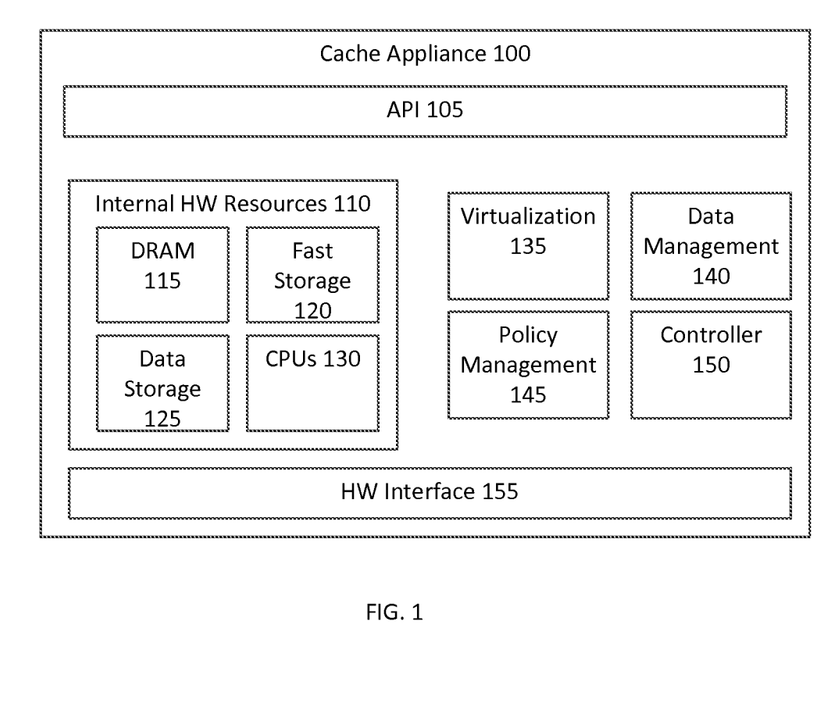
FIG. 1 is a simplified illustration of a caching appliance, in accordance with an embodiment of the present disclosure.

Refer to the example embodiment of FIG. 1. FIG. 1 is a simplified illustration of a caching appliance, in accordance with an embodiment of the present disclosure. As shown, Cache Appliance 100 includes an Advanced Programming Interface (API) 105, virtualization module 135, data management module 140, policy management module 145, controller module 150, Internal Hardware resources 110, and Hardware Interface 155. In this embodiment, Internal Hardware Resources 110 includes DRAM 115, Fast storage 120, data storage 125, and CPUs 130. In many embodiments, fast storage may include, but is not limited to, a flash storage device and/or Non-volatile Memory Device. In various embodiments, data storage may include rotational discs, and/or other data storage devices. As shown, Hardware interface 155 enables communication with public cloud storage providers and/or other data storage systems.

Figure 2:
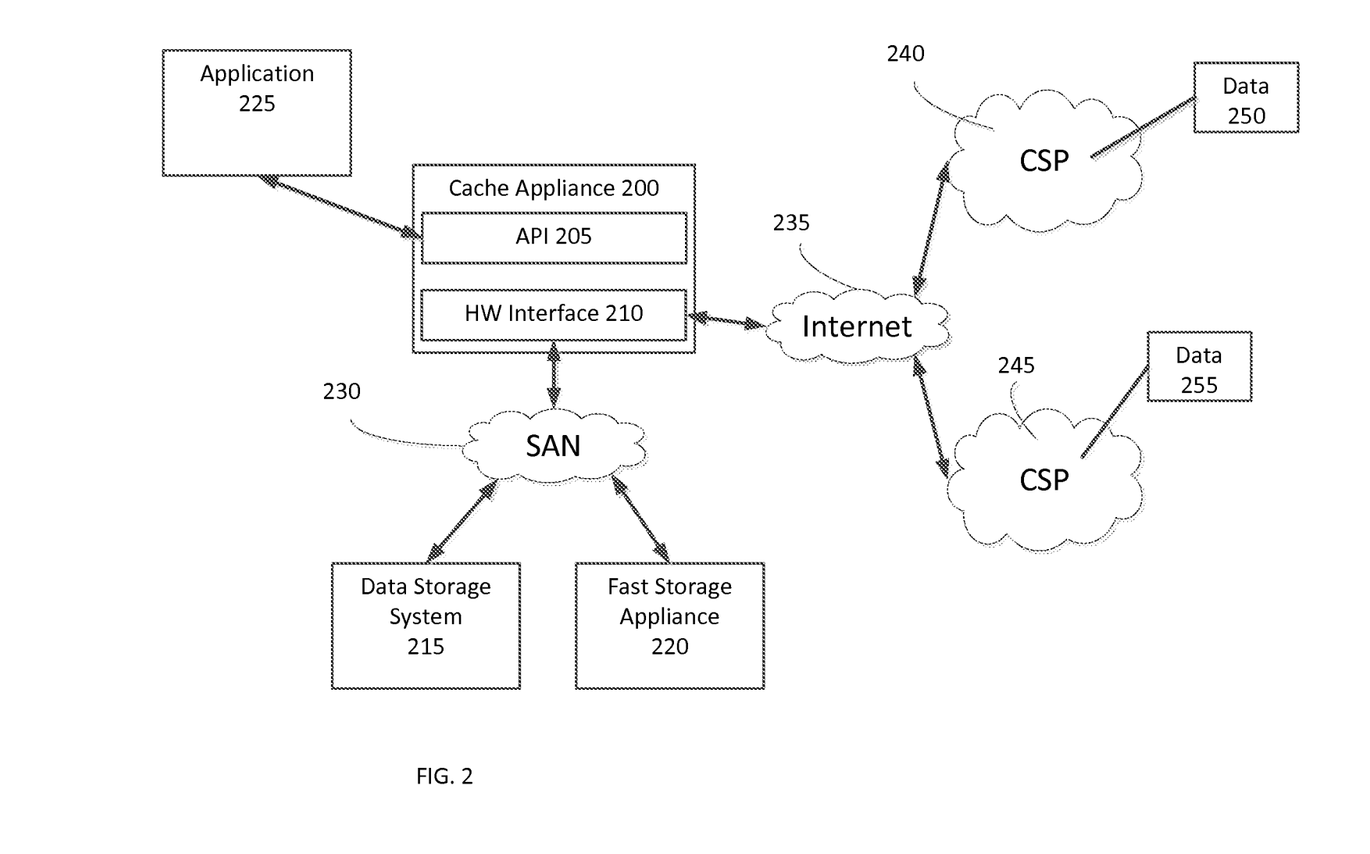
FIG. 2 is a simplified illustration of a caching appliance facilitating an application accessing a cloud storage provider, in accordance with an embodiment of the present disclosure.

Refer to the example embodiment of FIG. 2. FIG. 2 is a simplified illustration of a caching appliance facilitating an application accessing a cloud storage provider, in accordance with an embodiment of the present disclosure. As shown, cache appliance 200 is connected with Storage Area Network (SAN) 230 and internet 235. Cache appliance 200 includes API 205 to enable communication with Application 225. Cache appliance 200 includes Hardware Interface 210 to enable communication using SAN 230 and internet 235. In this embodiment, Cache Appliance 200 is enabled to utilize data storage system 215 and fast storage appliance 220 using SAN 230. Cache Appliance 200 is enabled to access Cloud Storage Provider (CSP) 240, 245 using internet 235. CSP 240 is storing data 250 for application 225. CSP 245 is storing data 255 for application 225. As shown, application 225 is enabled to use cache appliance 200 to as a cache for data 250 and data 255 stored within CSP 240 and CSP 245 respectively.

In many embodiments, a cache appliance may be enabled to use internal hardware resources to provide a virtual cache for one or more tenant applications. In various embodiments, a cache appliance may be enabled to use external data storage resources to provide a virtual cache for one or more tenant applications. In certain embodiments, a cache appliance may be enabled to use internal and external data storage resources to provide a virtual cache for one or more tenant applications. In some embodiments, a cache appliance may be enabled to provide a virtual cache using one or more tiers of data storage. In most embodiments, a tier of data storage may include, but is not limited to, flash storage, rotational disc, RAM, cache, and/or other data storage systems that may be available to a cache appliance.

Figure 3:
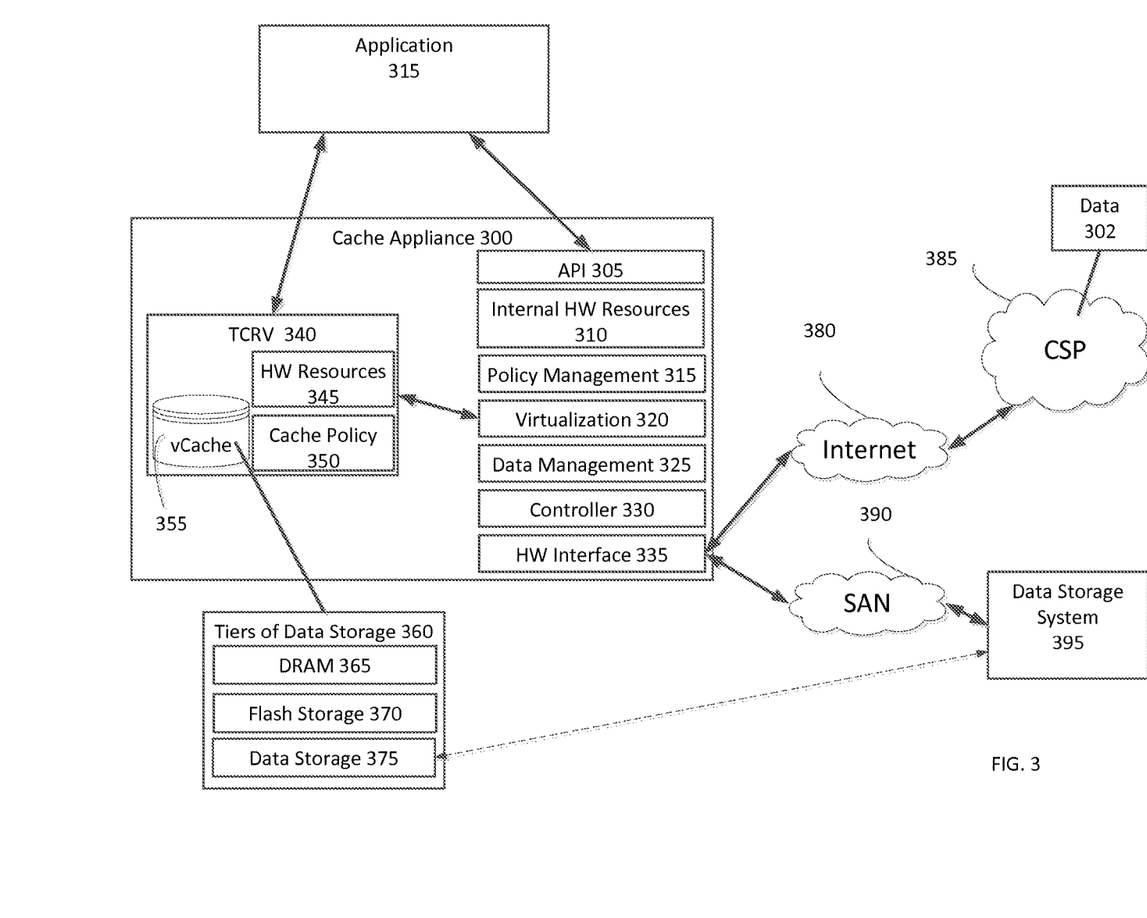
FIG. 3 is a simplified illustration of a cache appliance providing a virtual cache to a tenant application, in accordance with an embodiment of the present disclosure.

Refer to the example embodiment of FIG. 3. FIG. 3 is a simplified illustration of a cache appliance providing a virtual cache to a tenant application, in accordance with an embodiment of the present disclosure. As shown, cache appliance 300 is in communication with internet 380, Storage Area Network (SAN) 390, and application 315. Cache appliance 300 includes Advanced Programming Interface (API) 305, Internal Hardware Resources 310, Policy Management module 315, virtualization module 320, data management module 325, controller module 330, and Hardware Interface 335. Cache appliance 300 is enabled to access cloud storage provider (CSP) 385 using Hardware Interface 335 to communicate through internet 380. Cache appliance 300 is enabled to access data storage system 395 using hardware interface 335 to communicate through SAN 390 to data storage system 395.

In this embodiment, cache appliance 300 is enabled to accelerate the ability of application 315 access data 302 by caching one or more portions of data 302 within tenant cache resource vessel 340. API 305 receives data I/Os from application 315 related to data 302. API 305 sends data I/Os to data management module 325. Data management module 325 uses hardware interface 335 to communicate with CSP 385 using internet 380. Data management module 325 sends data I/Os to CSP 385 to update and/or retrieve one or more portions of data 302 from CSP. While Cache Appliance 300 is processing data I/Os from appliance 315, controller module 330 is enabled to analyze data I/Os processed by data management module 325. Controller module 330 is enabled to create a cache policy using policy management module 315 for data I/Os received by cache appliance 300.

In this embodiment, Controller module 330 is enabled to direct virtualization module 320 to create tenant cache resource vessel 340 which is a virtual space to accelerate access to data 302 by application 315. Virtualization module 320 is enabled to communicate with internal hardware resources 310 and data storage system 395 to create tenant cache resource vessel 340. Virtualization module 320 creates virtual cache 355 which, in this embodiment, is comprised of tiers of data storage 360. Tiers of data storage 360 includes DRAM 365, flash storage 370, and data storage 375. DRAM 365 and flash storage 370 are allocated from internal Hardware resources 310. Data storage 375 is allocated from data storage system 395. Virtualization module 320 allocates a portion of internal hardware resources 310 to create hardware resources 345. Hardware resources 345 includes processing resources enabled to facilitate use of virtual cache 355. In many embodiments, processing resources may include, but is not limited to, network bandwidth, CPU processing power, RAM, cache, and/or other types of computer resources. Controller module 330 updates tenant cache resource vessel 340 with cache policy 350. Upon creation of Tenant cache resource vessel 340, data management module 325 is enabled to utilize tenant cache resource vessel 340 to facilitate accelerated access to one or more portions of data 302 by application 315. Based on cache policy 350, data management module is enabled to cache one or more portions of data 302 from CSP 385 to the tiers of data storage 360 in virtual cache 355. Application 315 is enabled to access one or more portions of data 302 using tenant cache resource vessel 340.

Figure 4:
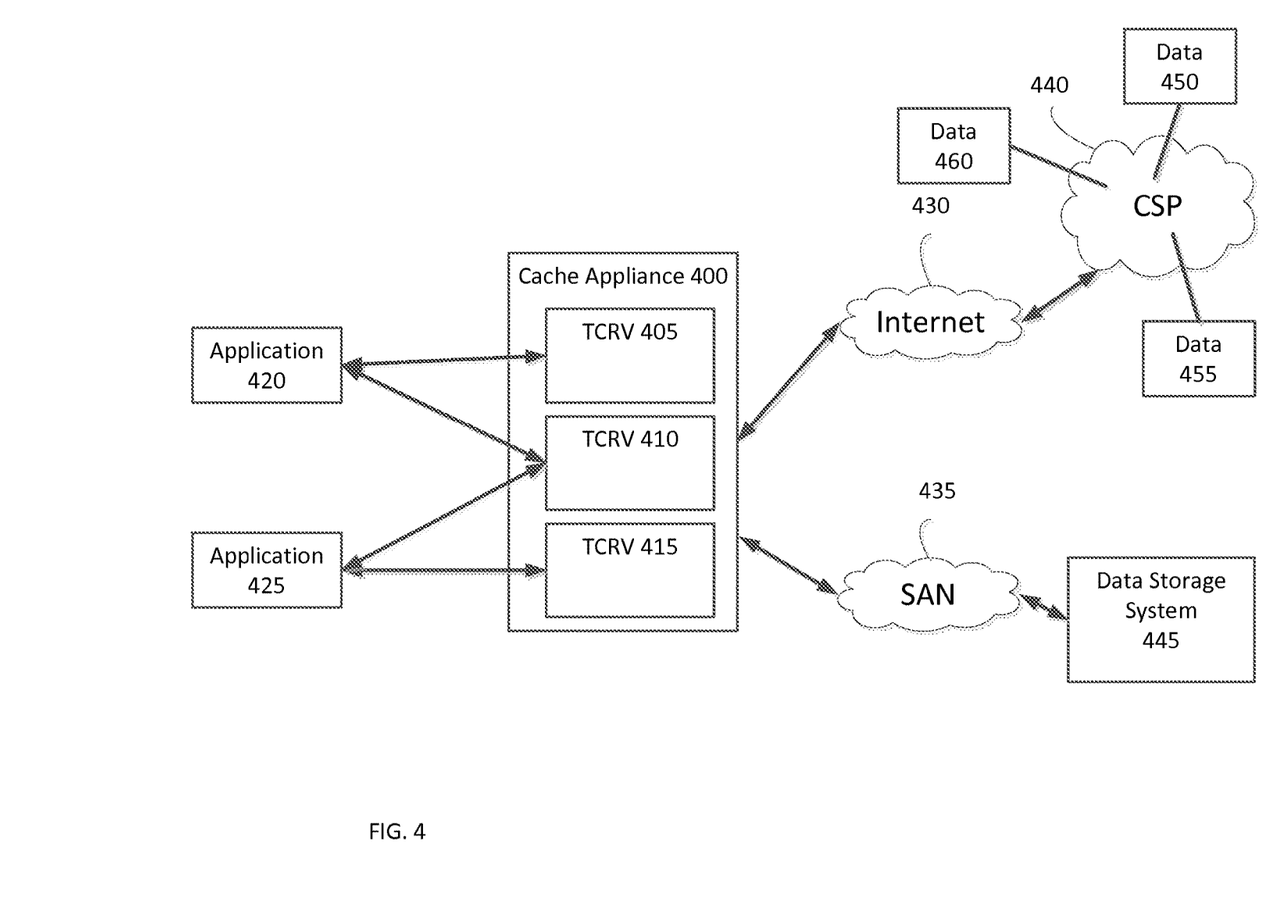
FIG. 4 is a simplified illustration of multiple applications accessing Tenant Cache Resource vessel within a cache appliance, in accordance with an embodiment of the present disclosure.

Refer to the example embodiment of FIG. 4. FIG. 4 is a simplified illustration of multiple applications accessing Tenant Cache Resource vessel within a cache appliance, in accordance with an embodiment of the present disclosure. As shown, cache appliance 400 is in communication with internet 430, Storage area Network (SAN) 435, and applications 420, 425. Cloud Storage Provider (CSP) 440 is connected to internet 430 and stores data 450, data 455, and data 460. Data storage system 445 is connected to SAN 435. Cache Appliance 400 is enabled to you internal hardware resources and/or data storage system 445 to create one or more Tenant Cache Resource Vessels to accelerate access to data stored within CSP 440.

In this embodiment, Application 420 is enabled to utilize cache appliance 400 to access data 450 and data 455. Application 425 is enabled to utilize cache appliance 400 to access data 455 and data 460. In this embodiment, Cache Appliance 400 is enabled to create Tenant Cache Resource Vessel (TCRV) 405, 410, 415 to manage data I/Os from application 420 and Application 425. Cache Appliance 400 is enabled to create separate TCRVs to handle each tenant application's needs. In this embodiment, as Application 420 and application 425 are accessing data 455, cache appliance 400 is enabled to create tcrv 410 which is enabled to handle requests from both Application 420 and application 425. Cache appliance 400 created tcrv 405 to manage data I/Os from application 420 related to data 450. Cache appliance 400 created tcrv 415 to manage data I/Os from application 425 relating to data 460.

Figure 5:
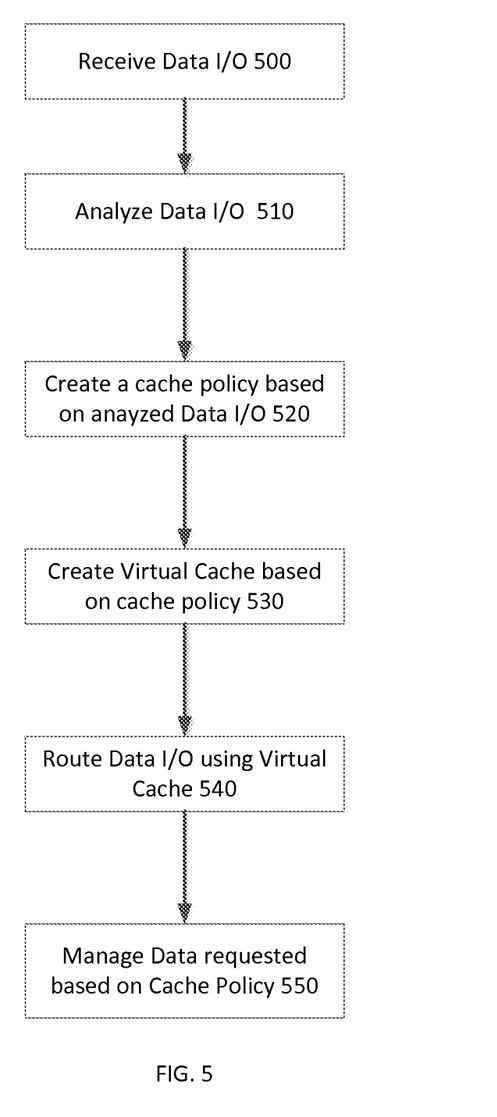
FIG. 5 is a simplified flowchart of a method of facilitating access to data stored within a cloud storage provider, in accordance with an embodiment of the present disclosure.

Refer to the example embodiments of FIGS. 3 and 5. FIG. 5 is a simplified flowchart of a method of facilitating access to data stored within a cloud storage provider, in accordance with an embodiment of the present disclosure. In FIG. 3, cache appliance is in communication with Cloud Storage Provider (CSP) 385, data storage system 395, and application 315. Application 315 utilizes Cache Appliance 300 to accelerate access to data 302 stored on CSP 385. Cache Appliance 300 receives data I/Os (Step 500) from Application 315 relating to data 302. Controller module 330 analyzes received data I/Os (Step 510) and directs policy management module 315 to create a cache policy based on the analyzed data I/O (Step 520). Controller module 330 directs virtualization module 320 to create Tenant Cache Resource Vessel (TCRV) 340 based on cache policy (Step 530). TCRV 340 includes virtual cache 355, hardware resources 345 allocated from internal hardware resources 310 and data storage system 395, and cache policy 350. Data management module 325 routes received data I/Os from application 315 using TCRV 340 (Step 540). Data management module 325 manages one or more portions of data 302 based on cache policy 350 (Step 550). In many embodiments, a data management module may cache one or more portions of data stored within a CSP on a TCRV resident in a cache appliance.

Figure 6:
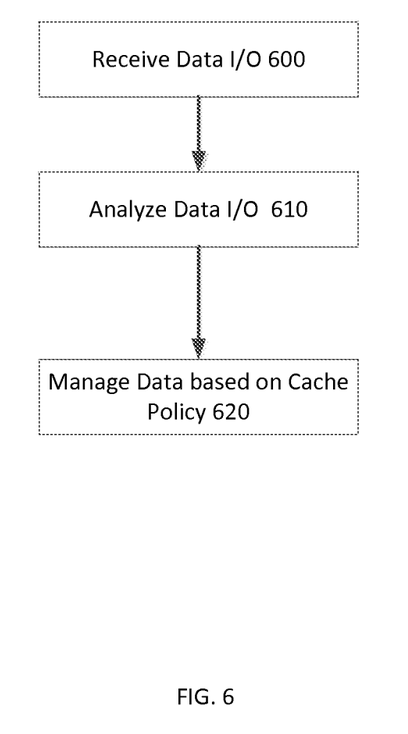
FIG. 6 is a simplified flowchart of a method of managing data using the cache appliance of FIG. 3, in accordance with an embodiment of the present disclosure.

Refer to the example embodiments of FIGS. 3 and 6. FIG. 6 is a simplified flowchart of a method of managing data using the cache appliance of FIG. 3, in accordance with an embodiment of the present disclosure. In FIG. 3, cache appliance is in communication with Cloud Storage Provider (CSP) 385, data storage system 395, and application 315. Application 315 utilizes Cache Appliance 300 to accelerate access to data 302 stored on CSP 385. In this embodiment, Tenant Cache Resource vessel 340 has been created facilitate processing data I/Os from application 315 relating to data 302. Cache Appliance 300 receives data I/Os from application 315 (Step 600). Controller module 330 analyzes incoming data I/Os to determine whether or not received data I/Os follow a pattern (Step 610). For example, in certain embodiments, an application may have execute a high number of data I/Os at specific times during the data, week, month, and/or year. Controller Module 330 updates cache policy 350 based on analysis of received data I/Os. Data management module 325 manages one or more portions of Data 302 based on cache policy and/or Data I/Os. For example, in this embodiment, if a first portion of data 302 is frequently accessed, data management module 325 will cache the first portion of data 302 on virtual cache 355. If a second portion of data 302 is currently cached on virtual cache 355 and less frequently used, data management module 325 will remove the second portion of data 302 from virtual cache 355 in lieu of a more frequently used portion of data 302.

Figure 7:
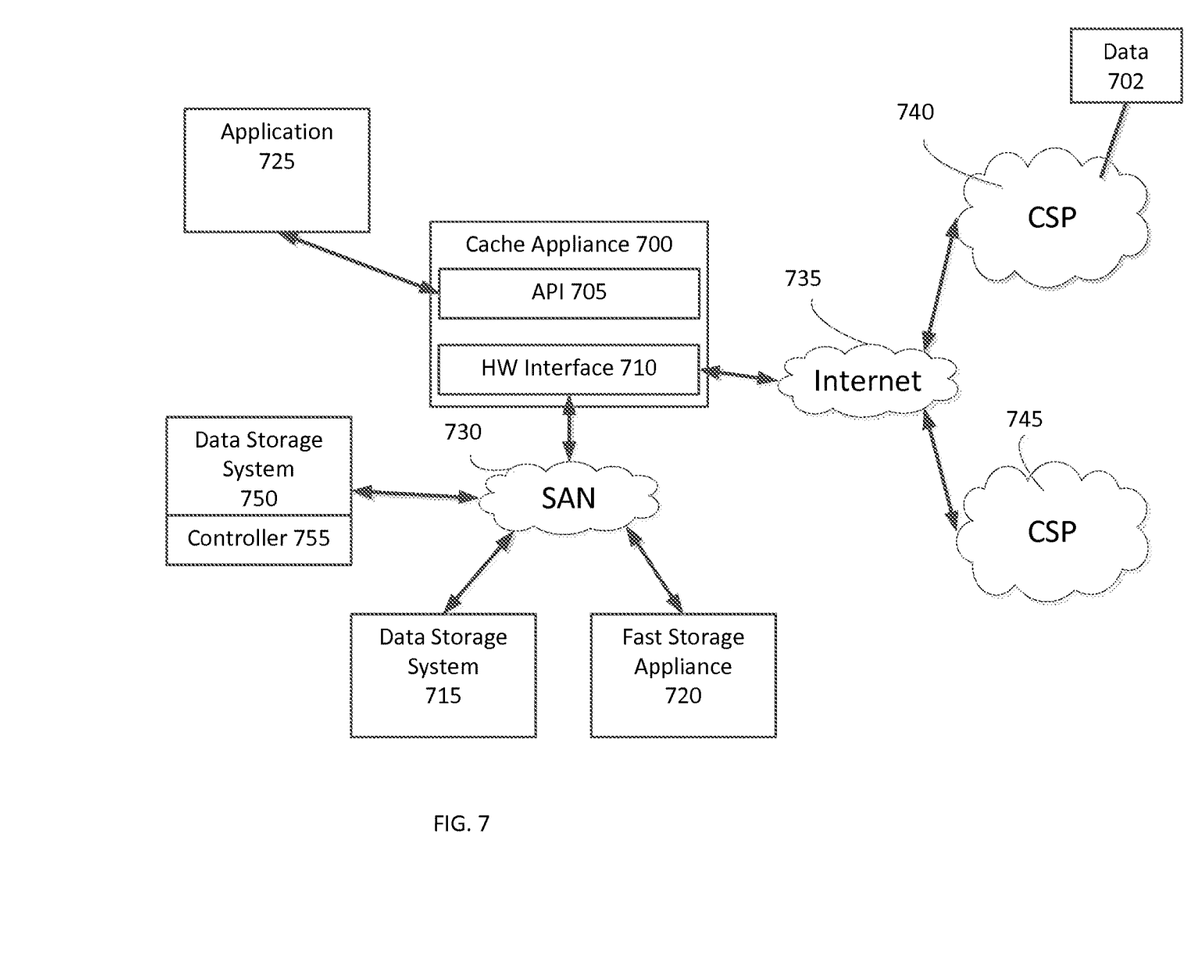
FIG. 7 is an alternate simplified illustration of an application using a cache appliance to facilitate access to a cloud storage provider, in accordance with an embodiment of the present disclosure.

Refer to the example embodiment of FIG. 7. FIG. 7 is an alternate simplified illustration of an application using a cache appliance to facilitate access to a cloud storage provider, in accordance with an embodiment of the present disclosure. In this embodiment, Cache appliance 700 is in communication with Cloud Service Provider 740, cloud service provider 745, data storage system 750, data storage system 715, fast storage appliance 720, and application 725. Cache Appliance 700 communicates with data storage system 750, data storage system 715, and fast storage appliance 720 through Hardware interface module 710 using Storage area Network (SAN) 730. In many embodiments, a fast storage appliance may include flash storage devices, Non-volatile memory devices, and/or other fast memory devices. Cache appliance 700 communicates with Cloud Storage Provider 740, 745 using hardware interface module 710 through internet 735. Application 725 sends data I/Os regarding data 702 to cache appliance 700 using API 705. In this embodiment, controller 755 is enabled to analyze data I/Os received by cache appliance 700 and enabled to direct cache appliance 700 to create one or more Tenant Cache Resource vessels based on analysis of the received data I/Os.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 8:
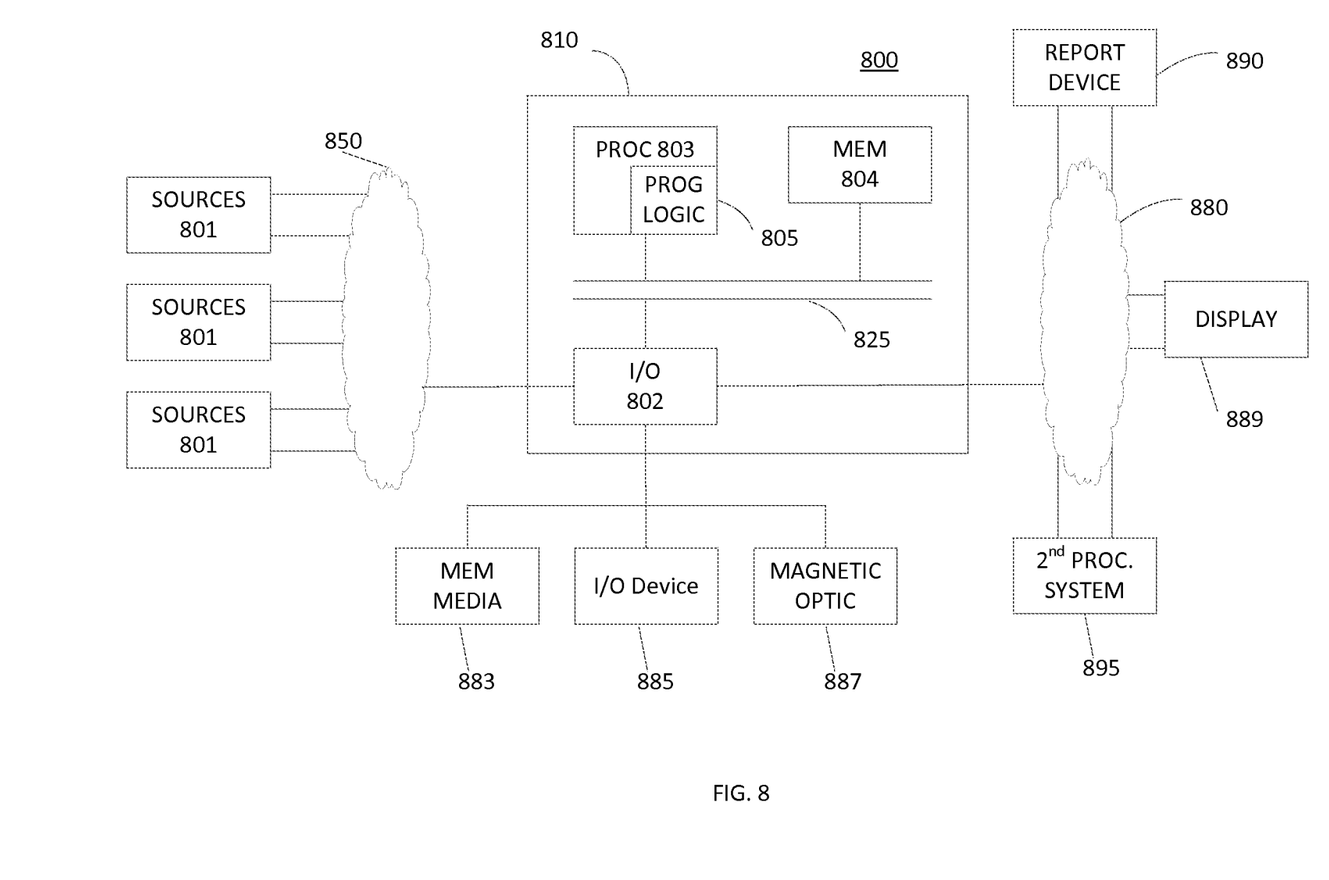
FIG. 8 is an example of an embodiment of an apparatus that may utilize the techniques described herein, in accordance with an embodiment of the present disclosure.

FIG. 8 is a block diagram illustrating an apparatus, such as a computer 810 in a network 800, which may utilize the techniques described herein according to an example embodiment of the present invention. The computer 810 may include one or more I/O ports 802, a processor 803, and memory 804, all of which may be connected by an interconnect 825, such as a bus. Processor 803 may include program logic 805. The I/O port 802 may provide connectivity to memory media 883, I/O devices 885, and drives 887, such as magnetic or optical drives. When the program code is loaded into memory 804 and executed by the computer 810, the machine becomes an apparatus for practicing the invention. When implemented on one or more general-purpose processors 803, the program code combines with such a processor to provide a unique apparatus that operates analogously to specific logic circuits. As such, a general purpose digital machine can be transformed into a special purpose digital machine.

Figure 9:
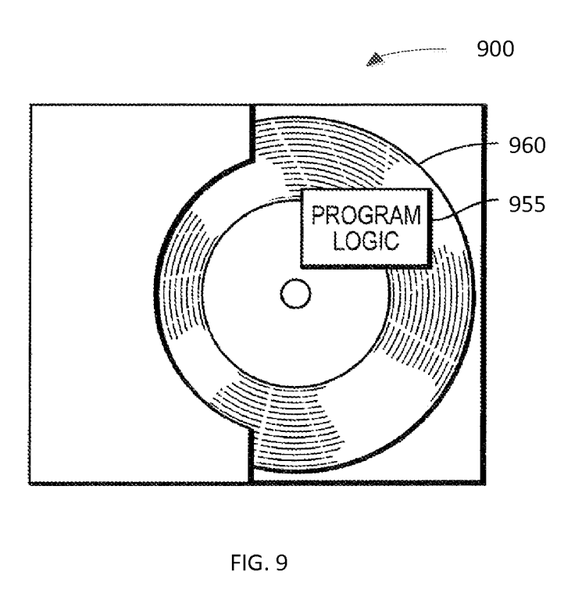
FIG. 9 is an example of a method embodied on a computer readable storage medium that may utilize the techniques described herein, in accordance with an embodiment of the present disclosure.

FIG. 9 is a block diagram illustrating a method embodied on a computer readable storage medium 960 that may utilize the techniques described herein according to an example embodiment of the present invention. FIG. 9 shows Program Logic 955 embodied on a computer-readable medium 960 as shown, and wherein the Logic is encoded in computer-executable code configured for carrying out the methods of this invention and thereby forming a Computer Program Product 900. Program Logic 955 may be the same logic 805 on memory 804 loaded on processor 803 in FIG. 8. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing data I/Os from an application in communication with a cache appliance, wherein the cache appliance is enabled to dynamically partition a cache storage area into a multi-tenant cache, which includes local data storage, is in communication with a cloud storage provider and one or more tiered data storage systems, the computer-executable method comprising:

receiving a data I/O from the application, wherein the data I/O relates to a first portion of data on the cloud storage provider;

analyzing the data I/O;

creating a caching policy based on the analysis of the data I/O, wherein the caching policy is enabled to accelerate the speed of the data I/O;

creating a virtual cache based on the caching policy, wherein the virtual cache includes tiers of data storage created from the local data storage of the cache appliance and the one or more tiered data storage systems;

dynamically partitioning the cache storage area into a multi-tenant cache, the multi-tenant cache having a dedicated space for each tenant, wherein the cache appliance is enabled to define whether tenants of the cache appliance are enabled to access another tenant's dedicated space; and managing the data I/O using the virtual cache, wherein the use of the virtual cache is based on the caching policy.

2. The computer-executable method of claim 1, wherein managing the data I/O comprises:

caching a second portion of data using the virtual cache, wherein the second portion of data is a subset of the first portion of data.

3. The computer-executable method of claim 1, wherein the creating of the virtual cache comprises;

creating a tenant cache resource vessel enabled to communicate using the caching appliance, wherein the tenant cache resource vessel utilizes a portion of available resources of the caching appliance; and creating the virtual cache, based on the caching policy, using the tenant cache resource vessel; and exposing the virtual cache to the application, wherein the application is enabled to access the first portion of data using the virtual cache.

4. The computer-executable method of claim 3, wherein the portion of available resources of the caching appliance comprises a data storage system in communication with the caching appliance.

5. The computer-executable method of claim 1, wherein the caching policy indicates an expiration time for data stored within the virtual cache.

6. The computer-executable method of claim 1, wherein managing the data I/O comprises:

monitoring usage of the virtual cache by the application to determine which portions of the first portion of data is hot data; and caching the hot data using the virtual cache, wherein the application is enabled to access the hot data using the virtual cache without accessing the cloud storage provider.

7. A system, comprising:

a cloud storage provider;

a cache appliance in communication with the cloud storage provider; and computer-executable program logic encoded in memory of one or more computers enabled to manage data I/Os from an application in communication with the cache appliance, wherein the cache appliance is enabled to dynamically partition a cache storage area into a multi-tenant cache, wherein the computer-executable program logic is configured for the execution of:

receiving a data I/O from the application, wherein the data I/O relates to a first portion of data on the cloud storage provider;

analyzing the data I/O;

creating a caching policy based on the analysis of the data I/O, wherein the caching policy is enabled to accelerate the speed of the data I/O;

creating a virtual cache based on the caching policy, wherein the virtual cache includes tiers of data storage created from the local data storage of the cache appliance and the one or more tiered data storage systems;

dynamically partitioning the cache storage area into a multi-tenant cache, the multi-tenant cache having a dedicated space for each tenant, wherein the cache appliance is enabled to define whether tenants of the cache appliance are enabled to access another tenant's dedicated space; and managing the data I/O using the virtual cache, wherein the use of the virtual cache is based on the caching policy.

8. The system of claim 7, wherein managing the data I/O comprises:

caching a second portion of data using the virtual cache, wherein the second portion of data is a subset of the first portion of data.

9. The system of claim 7, wherein the creating of the virtual cache comprises;

creating a tenant cache resource vessel enabled to communicate using the cache appliance, wherein the tenant cache resource vessel utilizes a portion of available resources of the caching appliance; and creating the virtual cache, based on the caching policy, using the tenant cache resource vessel; and exposing the virtual cache to the application, wherein the application is enabled to access the first portion of data using the virtual cache.

10. The system of claim 9, wherein the portion of available resources of the caching appliance comprises a data storage system in communication with the cache appliance.

11. The system of claim 7, wherein the caching policy indicates an expiration time for data stored within the virtual cache.

12. The system of claim 7, wherein managing the data I/O comprises:

monitoring usage of the virtual cache by the application to determine which portions of the first portion of data is hot data; and caching the hot data using the virtual cache, wherein the application is enabled to access the hot data using the virtual cache without accessing the cloud storage provider.

13. A computer program product for managing data I/Os from an application in communication with a cache appliance, wherein the cache appliance is in communication with a cloud storage provider having a first portion of data, and wherein the cache appliance is enabled to dynamically partition a cache storage area into a multi-tenant cache the computer program product comprising:

a non-transitory computer readable medium encoded with computer-executable code, the code configured to enable the execution of:

receiving a data I/O from the application, wherein the data I/O relates to a first portion of data on the cloud storage provider;

analyzing the data I/O;

creating a caching policy based on the analysis of the data I/O, wherein the caching policy is enabled to accelerate the speed of the data I/O;

creating a virtual cache based on the caching policy, wherein the virtual cache includes tiers of data storage created from the local data storage of the cache appliance and the one or more tiered data storage systems;

dynamically partitioning the cache storage area into a multi-tenant cache, the multi-tenant cache having a dedicated space for each tenant, wherein the cache appliance is enabled to define whether tenants of the cache appliance are enabled to access another tenant's dedicated space; and managing the data I/O using the virtual cache, wherein the use of the virtual cache is based on the caching policy.

14. The computer program product of claim 13, wherein managing the data I/O comprises:

caching a second portion of data using the virtual cache, wherein the second portion of data is a subset of the first portion of data.

15. The computer program product of claim 13, wherein the creating of the virtual cache comprises;
   creating a tenant cache resource vessel enabled to communicate using the caching appliance, wherein the tenant cache resource vessel utilizes a portion of available resources of the caching appliance; and
   creating the virtual cache, based on the caching policy, using the tenant cache resource vessel; and
   exposing the virtual cache to the application, wherein the application is enabled to access the first portion of data using the virtual cache.

16. The computer program product of claim 15, wherein the portion of available resources of the caching appliance comprises a data storage system in communication with the caching appliance.

17. The computer program product of claim 13, wherein the caching policy indicates an expiration time for data stored within the virtual cache.

18. The computer program product of claim 13, wherein managing the data I/O comprises:
   monitoring usage of the virtual cache by the application to determine which portions of the first portion of data is hot data; and
   caching the hot data using the virtual cache, wherein the application is enabled to access the hot data using the virtual cache without accessing the cloud storage provider.

\* \* \* \* \*